Figure 1:
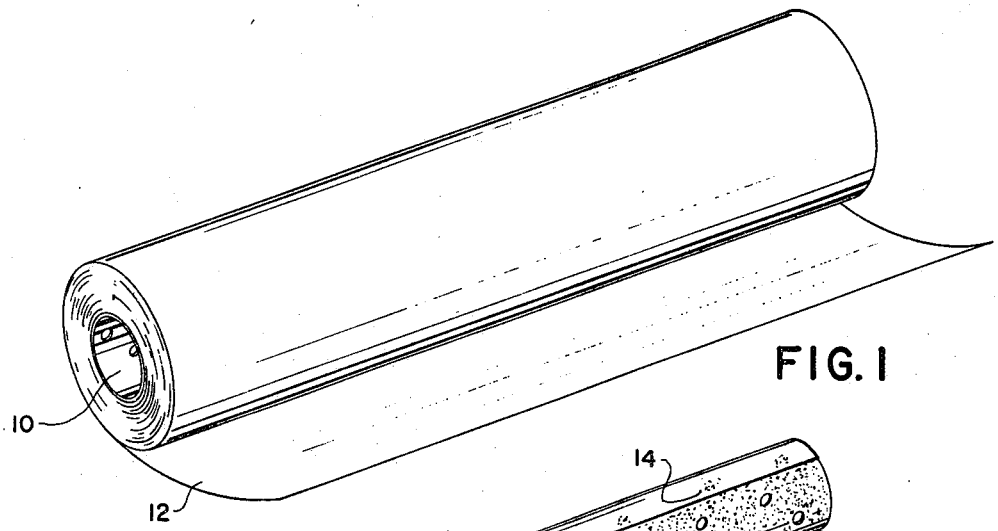
Figure 2:
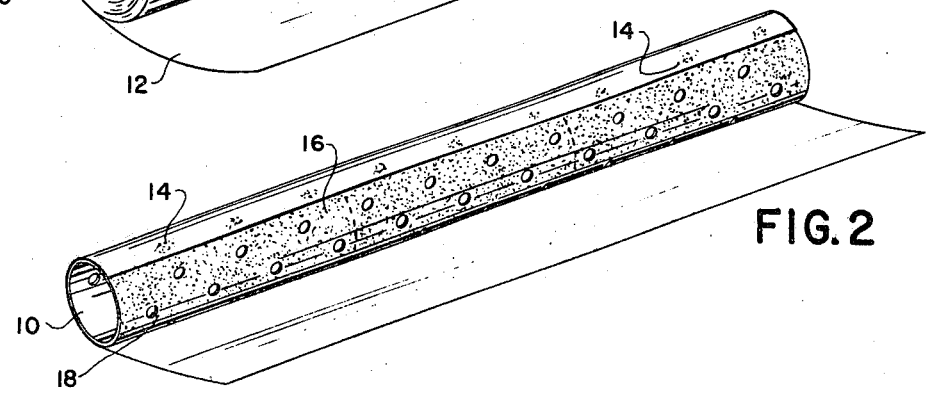
Figure 3:
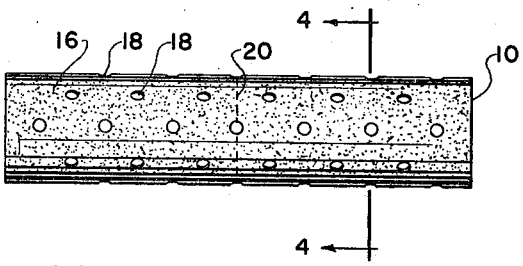
Figure 4:
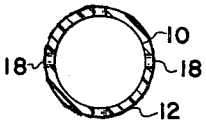
Figure 5:
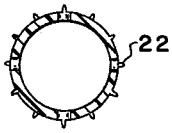

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 10, 1970

871 O.G. 354

T871,005
DUAL PURPOSE ARTICLE OF MANUFACTURE

Emma J. Freeman, P.O. Box 511,
Kingsport, Tenn. 37662

Filed July 25, 1969, Ser. No. 844,997
Int. Cl. A45d *2/02*
U.S. Cl. 132—39
1 Sheet Drawing. 6 Pages Specification

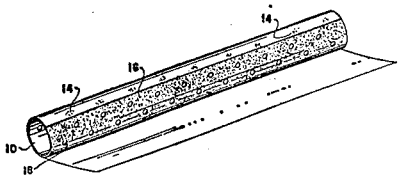

A dual purpose article of manufacture is provided in the form of a hollow, cylindrical core member which may first be used as a support for winding sheet material or the like, and subsequently as a hair curler. The core member is preferably made of polymeric material, and desirably is provided with a roughened surface. The walls of the core member may also be perforated, and may be provided with radial projections to aid in curling human hair.

Feb. 10, 1970 E. J. FREEMAN T871,005

DUAL PURPOSE ARTICLE OF MANUFACTURE

Filed July 25, 1969

EMMA J. FREEMAN
*INVENTOR.*

BY John F. Stevens

ATTORNEY